No. 721,292. PATENTED FEB. 24, 1903.
F. L. FORSTER.
FURNITURE COUPLING.
APPLICATION FILED AUG. 11, 1902.
NO MODEL.
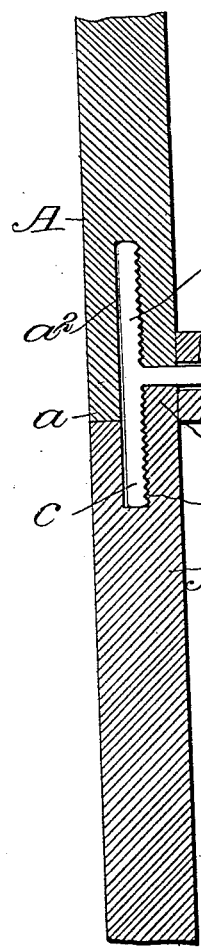
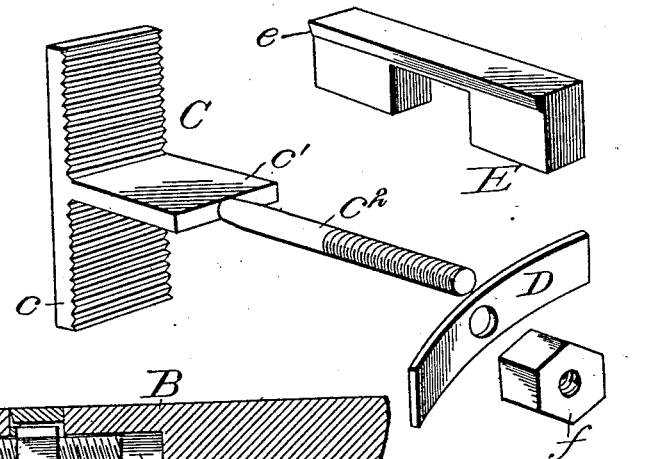
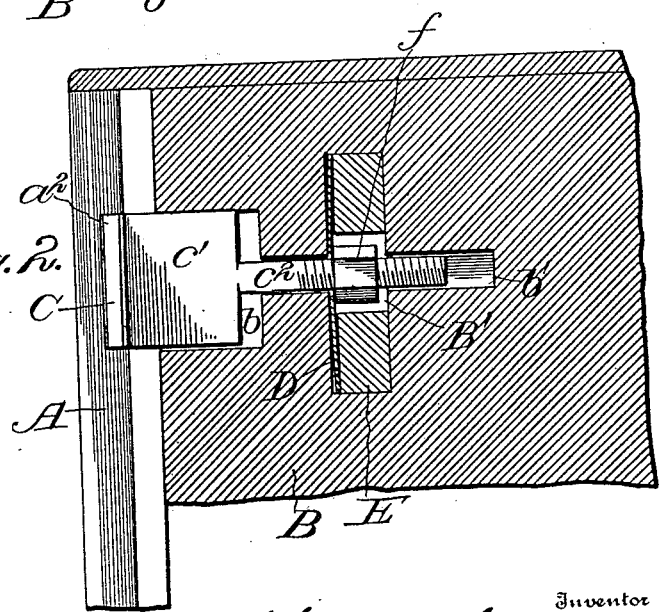

United States Patent Office.

FRANK L. FORSTER, OF SHELBYVILLE, INDIANA, ASSIGNOR OF ONE-HALF TO JACOB A. CONREY AND MARY CONREY, OF SHELBYVILLE, INDIANA.

FURNITURE-COUPLING.

SPECIFICATION forming part of Letters Patent No. 721,292, dated February 24, 1903.

Application filed August 11, 1902. Serial No. 119,234. (No model.)

*To all whom it may concern:*

Be it known that I, FRANK L. FORSTER, a citizen of the United States, residing at Shelbyville, in the county of Shelby and State of Indiana, have invented new and useful Improvements in Furniture-Couplings, of which the following is a specification.

This invention appertains to improvements in couplings for knockdown furniture, as sectional bookcases, the object being to provide simple, cheap, and effective means for connecting several parts together so that they can be readily separated, more particularly in such instances where two parts are to be maintained in line with each other and at right angles to a third part, as the ends and a horizontal part of a sectional case.

In carrying out the invention the ends or vertical parts of a case or other article of furniture are constructed to provide abutting shoulders and have recesses constructed to receive the cross-head of a coupling. The horizontal member has a straight or flush end and a recess for a plate which projects from the cross-head, as well as a bolt-receiving aperture and a recess which intersects such aperture, the same being intended to receive a washer and a nut, there also being provided a block constructed to close the bolt and washer receiving recess, the block being held in place by the resilient ends of the washer, all as will be hereinafter referred to or specifically pointed out in the claims.

In the accompanying drawings, which illustrate one embodiment of my invention, Figure 1 is a vertical section showing the application of the coupling to the end and horizontal members of an article of furniture. Fig. 2 is a horizontal section taken through the horizontal member of an article of furniture and through the filling-block and washer. Fig. 3 is a perspective view of the metallic parts of the coupling separated, and Fig. 4 is a perspective view of the block used for closing the washer and nut receiving recess.

In the embodiment of the invention illustrated, A A' indicate the end pieces of an article of furnature, as a section of a knockdown or separable bookcase, and the adjacent ends of such parts are provided with shoulders $a$ $a'$, so constructed that when the shoulders abut against the adjacent end a space will be provided for the passage therethrough of a plate or horizontal member of the coupling. The ends A A' have recesses $a^2$ $a^3$ for the reception of the cross-head of the coupling.

The horizontal member B of the case or article of furniture has a recess $b$, a bolt-receiving aperture $b'$, which projects therefrom and is intersected by a recess B' of sufficient size to receive a washer and nut, and a tool or wrench which is used to turn the nut to draw the parts together.

The coupling member C consists of a cross-head $c$, one face of which is serrated, and from the central portion of the cross-head there projects a plate C', the end of which carries a bolt C².

D refers to a washer, which is curved longitudinally, so that the ends will spring away from one of the walls of the recess B' and will bear upon the ends of a filling-block E, so as to retain the same in the recess. The filling-block E is cut away centrally to span the nut $f$, and the block has a projecting portion $e$, which will fill the space above the washer.

With the construction shown it will be noted that the end pieces A A' abut against the straight end of the horizontal part B and that by such construction when the nut is turned by a wrench to draw the parts together there is no liability of splitting or breaking the end portions with which the serrated head of the cross-head engages, and the block will be securely held in place by impinging against the resilient ends of the washer and the walls of the recess B'.

A coupling constructed as shown is concealed by the parts which it connects and may be tightened when desired by removing the block.

Having thus described my invention, what I claim as new, and desire to secure by Letters Patent, is—

1. In a knockdown article of furniture, two parts having recesses so positioned that when the parts are placed end to end the recesses will be in alinement, a third part having a recess, a bolt-aperture connected with the recess and intersected by a nut and washer receiving recess, in combination with a coupling comprising a cross-head, a plate which projects therefrom, a bolt formed integral with the plate and a nut and washer, substantially as shown.

2. In combination with a coupling comprising a cross-head, a plate which projects centrally therefrom and a bolt formed integral with the plate, one of the parts to be connected having a recess for a washer and nut, such recess being intersected by a bolt-receiving aperture, of a block which spans the bolt and closes the recess, and a washer having end portions which engage the block on each side of the bolt to retain the bolt in the recess.

3. The combination with a coupling member comprising a cross-head, a flat member which projects at right angles from the same, and a bolt integral with the flat member, of separable parts constructed to present contiguous recesses which receive the cross-head and are maintained in line thereby, and a third part having a recess and an aperture which extends therefrom for the reception of the flat member and the bolt of the coupling, substantially as shown and for the purpose set forth.

In testimony whereof I have hereunto set my hand in the presence of two subscribing witnesses.

FRANK L. FORSTER.

Witnesses:
ROBT. W. BUXTON,
H. K. MORRIS.